(12) United States Patent
Li et al.

(10) Patent No.: US 7,422,238 B2
(45) Date of Patent: Sep. 9, 2008

(54) RAKE DESIGN FOR STEERING COLUMN RAKE ADJUSTMENT

(75) Inventors: Xiaoyu Li, Saginaw, MI (US); Richard K. Riefe, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 343 days.

(21) Appl. No.: 11/032,925

(22) Filed: Jan. 11, 2005

(65) Prior Publication Data

US 2006/0151985 A1 Jul. 13, 2006

(51) Int. Cl.
B62D 1/18 (2006.01)
(52) U.S. Cl. ............................ 280/775; 74/493; 74/495
(58) Field of Classification Search .................. 280/89, 280/771, 775, 779; 74/493, 494, 495
See application file for complete search history.

(56) References Cited

U.S. PATENT DOCUMENTS

| | | | |
|---|---|---|---|
| 4,018,101 A | | 4/1977 | Mihalic |
| 4,516,440 A | * | 5/1985 | Nishikawa .................... 74/493 |
| 4,594,909 A | * | 6/1986 | Yamaguchi .................... 74/493 |
| 4,732,050 A | | 3/1988 | Vollmer |
| 4,958,852 A | * | 9/1990 | Kohno et al. ................. 280/775 |
| 5,005,862 A | * | 4/1991 | Yamaguchi .................. 280/775 |
| 5,052,240 A | | 10/1991 | Miyoshi et al. |
| 5,078,022 A | * | 1/1992 | Ichikawa ....................... 74/493 |
| 5,088,766 A | * | 2/1992 | Nakatsuka et al. ........... 280/775 |
| 5,144,855 A | * | 9/1992 | Yamaguchi et al. ............ 74/493 |
| 5,209,512 A | * | 5/1993 | Hancock et al. .............. 280/775 |
| 5,222,410 A | * | 6/1993 | Kinoshita ....................... 74/493 |
| 5,419,581 A | | 5/1995 | Schafer et al. |
| 5,452,624 A | * | 9/1995 | Thomas et al. ................. 74/493 |
| 5,566,585 A | * | 10/1996 | Snell et al. ..................... 74/493 |
| 5,570,610 A | | 11/1996 | Cymbal |
| 5,593,183 A | * | 1/1997 | Fouquet et al. ............... 280/775 |
| 5,743,151 A | * | 4/1998 | Khalifa et al. .................. 74/493 |
| 5,788,277 A | * | 8/1998 | Hibino et al. ................ 280/775 |
| 5,823,062 A | * | 10/1998 | Snell et al. ..................... 74/493 |
| 5,915,726 A | * | 6/1999 | Hibino et al. ................ 280/775 |
| 6,382,047 B2 | * | 5/2002 | Bowerman et al. ............ 74/493 |
| 6,543,807 B2 | * | 4/2003 | Fujiu et al. ................... 280/775 |
| 6,591,709 B1 | * | 7/2003 | Kim et al. ....................... 74/493 |
| 6,964,432 B2 | * | 11/2005 | Morita et al. ................ 280/775 |
| 6,986,531 B2 | * | 1/2006 | Ohtsu et al. .................. 280/775 |
| 7,083,198 B2 | * | 8/2006 | Lee .............................. 280/775 |
| 7,093,855 B2 | * | 8/2006 | Manwaring et al. .......... 280/775 |

(Continued)

FOREIGN PATENT DOCUMENTS

DE 19545438 9/1998

(Continued)

Primary Examiner—Kevin Hurley
Assistant Examiner—Barry Gooden, Jr.
(74) Attorney, Agent, or Firm—Michael D. Smith

(57) ABSTRACT

The invention provides a steering column assembly having a steering column member for first pivotal movement about a first pivoting axis. The steering column assembly also includes a lever supported for second pivotal movement about a fulcrum. The lever includes a first end pivotally attached to the steering column member and a second end on an opposite side of the fulcrum relative to the first end. The steering column assembly also includes a lock operable to apply a locking force to selectively lock the second end.

12 Claims, 2 Drawing Sheets

U.S. PATENT DOCUMENTS

| | | | |
|---|---|---|---|
| 7,127,963 B2 * | 10/2006 | Lee | 74/493 |
| 2002/0024208 A1 * | 2/2002 | Fujiu et al. | 280/775 |
| 2003/0094063 A1 * | 5/2003 | Cooper et al. | 74/493 |
| 2003/0121353 A1 * | 7/2003 | Jolley | 74/493 |
| 2003/0164608 A1 * | 9/2003 | Morita et al. | 280/775 |
| 2004/0195816 A1 * | 10/2004 | Park | 280/775 |
| 2004/0251673 A1 * | 12/2004 | Lee | 280/775 |
| 2005/0017492 A1 * | 1/2005 | Ohtsu et al. | 280/775 |

FOREIGN PATENT DOCUMENTS

| | | |
|---|---|---|
| EP | 0358198 | 3/1990 |
| EP | 0599073 | 6/1994 |

* cited by examiner

RAKE DESIGN FOR STEERING COLUMN RAKE ADJUSTMENT

FIELD OF THE INVENTION

The invention relates to steering column assembly for a vehicle and more particularly to a steering column assembly moveable in raking adjustment between a plurality of rake positions and having a lock to fix the steering column assembly at any one of the plurality of rake positions.

BACKGROUND OF THE INVENTION

A steering column assembly 10 of the prior art is shown in FIG. 1. The steering column assembly 10 includes a steering column member 14 rotatable about a first pivoting axis 16 in raking adjustment between a plurality of rake positions. A lock 26 fixes the steering column assembly 10 at any one of the plurality of rake positions. The lock 26 includes a handle 32 moveable along an arcuate path 34 about an axis 36. The handle 32 rotates a shaft (not visible) aligned with the axis 36 to move mating cam members (not visible). When the handle 32 rotates in a first direction along the path 34, the cam members cooperate to urge each other apart, creating compressive forces between portions of the steering column assembly 10 and the lock 26. These forces increase friction and lock the steering column assembly 10 and the lock 26 together. When the handle 32 rotates in a second direction opposite the first direction along the path 34, the cam members cooperate to move closer together, reducing the compressive forces and friction to unlock the steering column assembly 10 and the lock 26. Examples of these kinds of compressive or friction locks are disclosed in U.S. Pat. Nos. 4,732,050; 5,052,240; and 5,570,610.

SUMMARY OF THE INVENTION AND ADVANTAGES

The invention provides a steering column assembly having a steering column member for first pivotal movement about a first pivoting axis. The steering column assembly also includes a lever supported for second pivotal movement about a fulcrum. The lever includes a first end pivotally attached to the steering column member and a second end on an opposite side of the fulcrum relative to the first end. The steering column assembly also includes a lock operable to apply a locking force to selectively lock the second end.

The advantages of the exemplary embodiment of the invention include reduced force required by the operator of the vehicle, reduced forced required of the locking mechanism, and a reduction in the size of the lock if desired.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
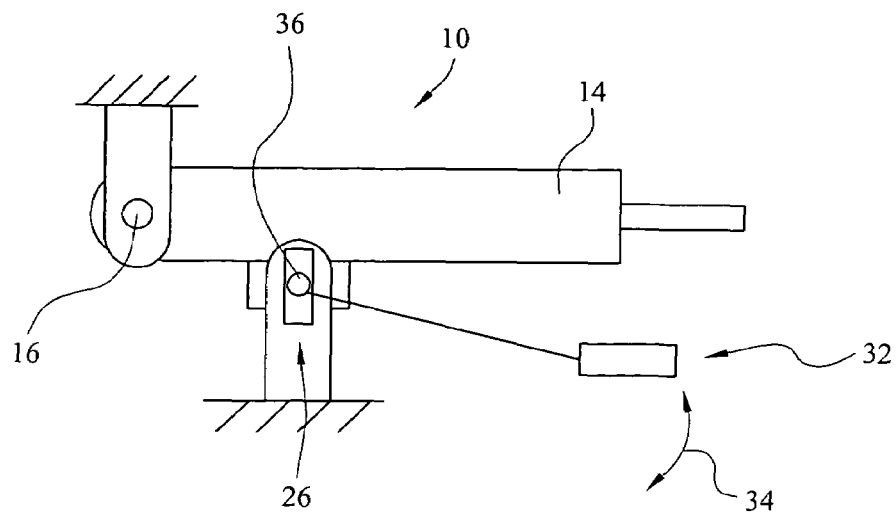
FIG. 1 is schematic view of a steering column assembly disclosed in the prior art.

A plurality of different embodiments of the invention are shown in the Figures of the application. Similar features are shown in the various embodiments of the invention. Similar features have been numbered with a common two-digit reference numeral and have been differentiated by a third digit placed before the two common digits. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Figure 2:
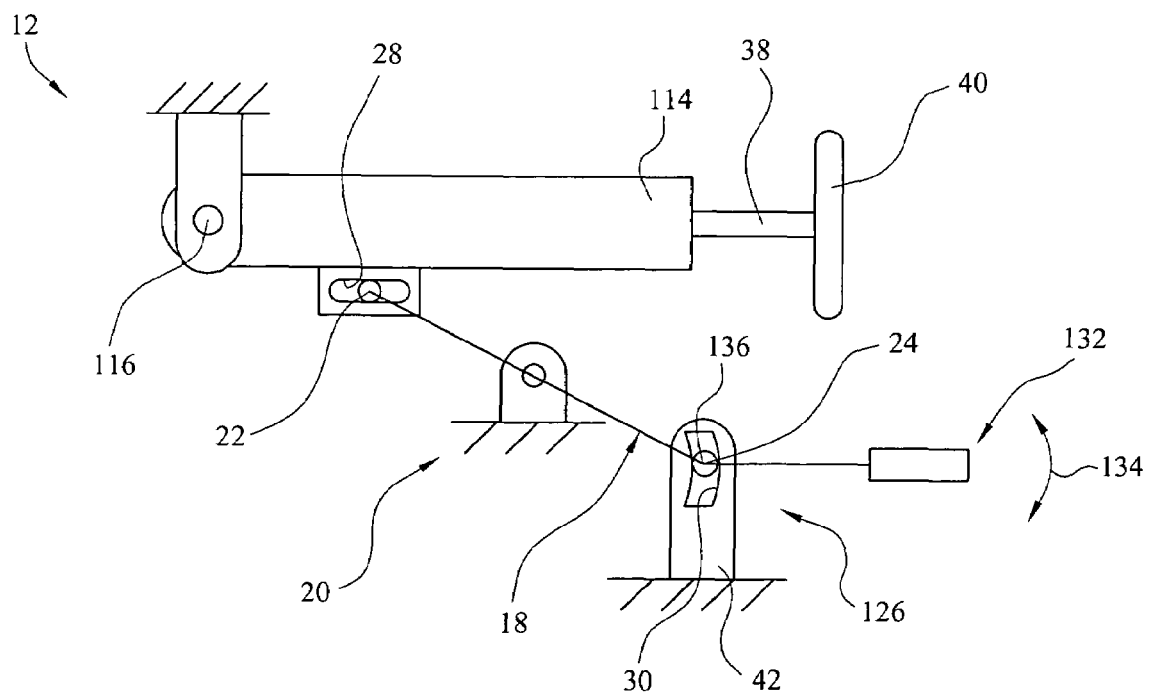
FIG. 2 is schematic view of a steering column assembly according to a first exemplary embodiment of the invention.

In a first embodiment of the invention, shown in FIG. 2, the invention provides a steering column assembly 12 having a steering column member 114 for first pivotal movement about a first pivoting axis 116. The steering column assembly 12 also includes a lever 18 supported for second pivotal movement about a fulcrum 20. The lever 18 includes a first end 22 pivotally attached to the steering column member 114 and a second end 24 on an opposite side of the fulcrum 20 relative to the first end 22. The steering column assembly 12 also includes a lock 126 operable to apply a locking force to selectively lock the second end 24.

The exemplary steering column assembly 12 includes a single steering column member 114. However, in alternative embodiments of the invention, the steering column assembly 12 could include a pair of members or jackets disposed in telescoping relation. The steering column member 114 at least partially encircles a steering shaft 38. A steering wheel 40 is mounted in a vehicle at an end of the steering shaft 38. The steering column member 114 is disposed for raking movement, wherein the first pivoting axis 116 is disposed substantially at an opposite end of the steering column member 114 with respect to said steering wheel 40.

The steering column member 114 is rotatable about the first pivoting axis 116 in raking adjustment between a plurality of rake positions. The lock 126 fixes the steering column assembly 10 at any one of the plurality of rake positions. The lock 126 of the first exemplary embodiment is a compressive or friction lock and includes a handle 132 moveable along an arcuate path 134 about an axis 136. The handle 132 rotates a shaft (not visible) aligned with the axis 136 to move mating cam members (not visible). When the handle 132 rotates in a first direction along the path 132, the cam members cooperate to urge each other apart, creating compressive forces between portions of the steering column member 114 and the second end 24 of the lever 18. These forces increase friction and lock the second end 24 and the lock 126 together. For example, the lock 126 includes a bracket 42 fixed to the vehicle, the bracket 42 and the second end 24 being lockable with respect to one another. When the handle 32 rotates in a second direction opposite the first direction along the path 32, the cam members cooperate to move closer together, reducing the compressive forces and friction to unlock the second end 24 and the bracket lock 32. In alternative embodiments of the invention, the lock 126 could be a positive lock.

The fulcrum 20 of the exemplary embodiment is disposed closer to the first end 22 than the second end 24. As a result, the locking force applied to the second end 24 is multiplied at the first end 22. For example, in view of FIG. 1, assume a force of three hundred pounds is required at the lock 26 to maintain the position of the steering column member 14 over forces acting on the steering wheel. Also, in view of FIG. 2, assume the distance between the fulcrum 20 and the second end 24 is five times the distance between the fulcrum 20 and the first end 22. The first exemplary embodiment of the invention reduces the force required to maintain the position of the steering column member 14 by four-fifths. In other words, three hundred pounds of force disposed one unit of measurement from the fulcrum corresponds to sixty pounds of force five units of measurement from the fulcrum. The structure provided by the invention provides several benefits in the first exemplary embodiment of the invention. First, the structure reduces the amount of force that must be generated by the lock 126. The lock 126 can be smaller, while maintaining the strength and robustness required in any particular operating environment. A second advantage is that the force required of the operator to engage the lock 126 is reduced. A third advantage is that the extent of movement of the handle 132 over the path 134 can be reduced, while maintaining the strength and robustness required in any particular operating environment. A fourth advantage is that the structure provides flexibility in mounting the lock 126. In other words, the lock 126 can be mounted at any location remote from the steering column member 114. Other advantages may spring from application of the structure of the invention to other operating environments in alternative embodiments of the invention.

Figure 3:
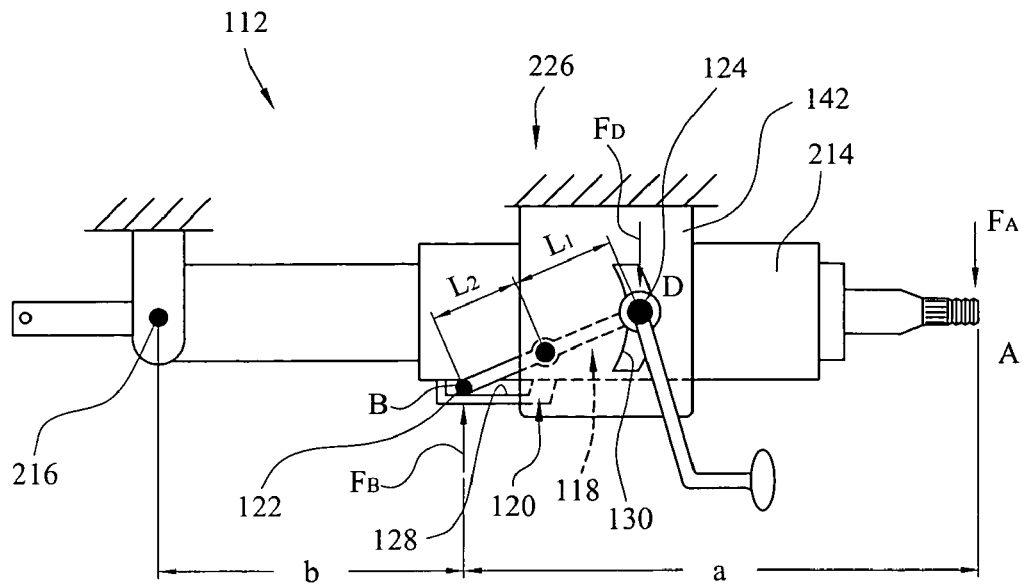
FIG. 3 is schematic view of a steering column assembly according to a second exemplary embodiment of the invention.

In a second embodiment of the invention, shown in FIG. 3, the invention provides a steering column assembly 112 having a steering column member 214 for first pivotal movement about a first pivoting axis 216. The steering column assembly 112 also includes a lever 118 supported for second pivotal movement about a fulcrum 120. The lever 118 includes a first end 122 pivotally attached to the steering column member 214 and a second end 124 on an opposite side of the fulcrum 120 relative to the first end 122. The steering column assembly 112 also includes a lock 226 operable to apply a locking force to selectively lock the second end 124.

This force multiplying relationship set forth above is also demonstrated in the second embodiment of the invention shown in FIG. 3. Reference character "a" is the distance between the first end 122 of the lever 118 and a point A. A force $F_A$ acts at point A. Reference character "b" is the distance between the first end 122 of the lever 118 and the first pivoting axis 216. Reference character "$L_1$" is the distance between the fulcrum and the second end 124. Reference character "$L_2$" is the distance between the fulcrum and the first end 122. The holding force $F_B$ at point B required to maintain the position of a steering column member 214 over force $F_A$ acting at point A equals:

$$F_B = (1 + a/b) F_A$$

The corresponding holding force $F_D$ required at point D equals:

$$F_D = F_B * (L_2/L_1)$$

Since $L_1$ is greater than $L_2$, $F_B$ is greater than $F_D$.

Figure 4:
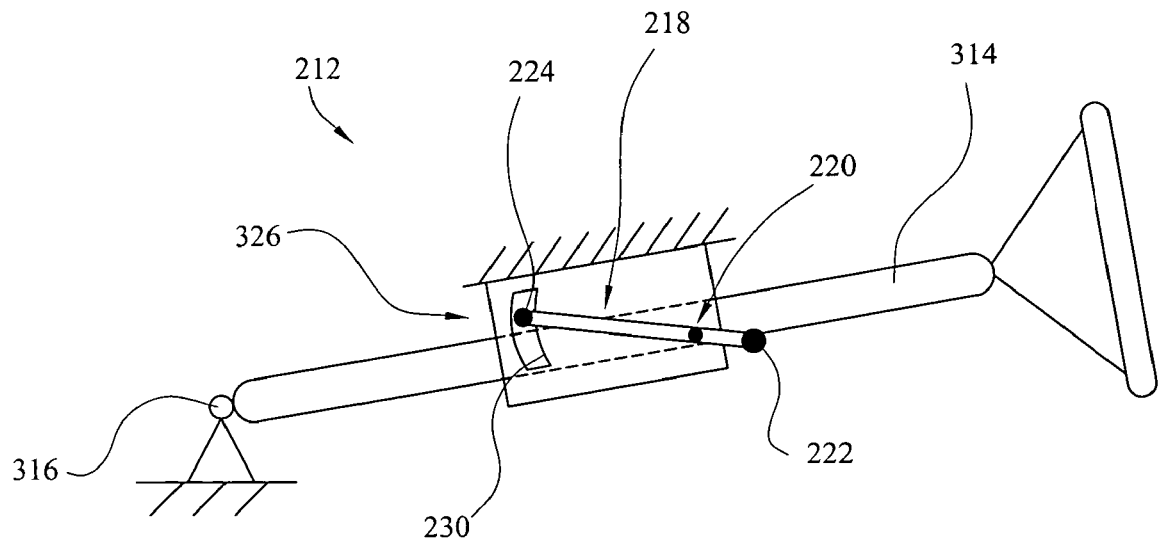
FIG. 4 is schematic view of a steering column assembly according to a third exemplary embodiment of the invention.

In a third embodiment of the invention, show in FIG. 4, the invention provides a steering column assembly 212 having a steering column member 314 for first pivotal movement about a first pivoting axis 316. The steering column assembly 212 also includes a lever 218 supported for second pivotal movement about a fulcrum 220. The lever 218 includes a first end 222 pivotally attached to the steering column member 314 and a second end 224 on an opposite side of the fulcrum 220 relative to the first end 222. The steering column assembly 212 also includes a lock 326 operable to apply a locking force to selectively lock the second end 224.

The relative positions of the first and second ends and fulcrum can be varied to enhance the operation of any particular operating environment. For example, in the first exemplary embodiment of the invention shown in FIG. 2, the first end 22 is spaced closer to the first pivoting axis 116 than the second end 24. Similarly, in the second exemplary embodiment of the invention shown in FIG. 3, the first end 122 is spaced closer to the first pivoting axis 216 than the second end 124. On the other hand, in the third exemplary embodiment of the invention shown in FIG. 4, the first end 222 is spaced further from the first pivoting axis 316 than the second end 224.

In the exemplary embodiments of the invention shown in the application, at least one of the first steering column member 114, 214, 314 and the lock 126, 226, 326 includes a slot 28, 128, 30, 130, 230 receiving the respective end 22, 122, 222, 24, 124, 224 of the lever 18, 118, 218. The slots 28, 128, 30, 130, 230 are centered on the respective fulcrums 20, 120, 220. The respective end 22, 122, 222, 24, 124, 224 is moveable in the slot 28, 128, 30, 130, 230 when the lock 126, 226, 326 is unlocked. For example, in the first exemplary embodiment of the invention shown in FIG. 2, the first steering column member 114 includes a first slot 28 receiving the first end 22 and the lock 126 includes a second slot 30 receiving the second end 24. Similarly, in the second exemplary embodiment of the invention shown in FIG. 3, the first steering column member 214 includes a first slot 128 receiving the first end 122 and the lock 226 includes a second slot 130 receiving the second end 124. The lock 226 includes a bracket 142 defining the second slot 130 and encircling the steering column member 214. The lever 118 is disposed between the bracket 142 and the steering column member 214. In the third exemplary embodiment of the invention shown in FIG. 4, the lock 326 includes a second slot 230 receiving the second end 224. The first end 222 is linearly fixed and rotatably engaged with respect to the first steering column member 314.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly comprising:
   a steering column member for first pivotal movement about a first pivoting axis;
   a lever supported for second pivotal movement about a fulcrum with a first distal end on one side of the fulcrum pivotally attached directly to said steering column member and a second distal end on an opposite side of said fulcrum relative to said first end; and
   a lock directly engaging said second end of said lever and operable to apply a locking force to selectively lock said second end.

2. The steering column assembly of claim 1 wherein said fulcrum is disposed closer to said first end than said second end such that said locking force on said second end is multiplied at said first end.

3. The steering column assembly of claim 1 wherein said steering column member is further defined as being a steering column jacket disposed for raking movement.

4. The steering column assembly of claim 1 wherein said lock is a compression lock.

5. The steering column assembly of claim 1 wherein said second end is spaced closer to said first pivoting axis than said first end.

6. The steering column assembly of claim 1 wherein said first end is spaced closer to said first pivoting axis than said second end.

7. The steering column assembly of claim 1 wherein at least one of said steering column member and said lock includes a slot receiving said respective end of said lever, wherein said respective end is moveable in said slot when said lock is unlocked.

8. The steering column assembly of claim 1 further including a handle engaging one of said first and second ends of said lever to pivot said lever about said fulcrum.

9. The steering column assembly of claim 7 wherein said lock includes said slot receiving said second end and said first end is rotatably engaged to said steering column member.

10. A steering column assembly comprising:
a steering column member for first pivotal movement about a first pivoting axis;
a lever supported for second pivotal movement about a fulcrum with a first end pivotally attached to said steering column member and a second end on an opposite side of said fulcrum relative to said first end;
a lock operable to apply a locking force to selectively lock said second end; and
said steering column member including a first slot receiving said first end and said lock including a second slot receiving said second end of said lever, wherein said second end is moveable in said second slot when said lock is unlocked.

11. A method of locking a steering column assembly comprising the steps of:
pivotally moving a steering column member about a first pivoting axis in first pivotal movement;
supporting a lever for second pivotal movement about a fulcrum with a first distal end on one side of the fulcrum pivotally attached directly to said steering column member and a second distal end on an opposite side of said fulcrum relative to said first end; and
applying a locking force with a lock directly engaging the second end of the lever to selectively lock the second end.

12. The method of claim 11 wherein the step of applying the locking force includes the step of moving a handle connected to the lever through an arcuate path to selectively lock the second end.

\* \* \* \* \*